(12) United States Patent
Mueller et al.

(10) Patent No.: US 8,596,139 B2
(45) Date of Patent: Dec. 3, 2013

(54) ULTRASONIC TRANSDUCER FOR USE IN A FLUID MEDIUM

(75) Inventors: Roland Mueller, Steinheim (DE); Gerhard Hueftle, Aspach (DE); Michael Horstbrink, Stuttgart-Feuerbach (DE); Tobias Lang, Stuttgart (DE); Sami Radwan, Stuttgart (DE); Bernd Kuenzl, Schwieberdingen (DE); Roland Wanja, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 13/141,963

(22) PCT Filed: Nov. 17, 2009

(86) PCT No.: PCT/EP2009/065290
§ 371 (c)(1),
(2), (4) Date: Sep. 6, 2011

(87) PCT Pub. No.: WO2010/072470
PCT Pub. Date: Jul. 1, 2010

(65) Prior Publication Data
US 2011/0314933 A1   Dec. 29, 2011

(30) Foreign Application Priority Data

Dec. 23, 2008  (DE) .......................... 10 2008 055 126

(51) Int. Cl.
*G01F 1/20* (2006.01)
(52) U.S. Cl.
USPC ...................................... 73/861.18
(58) Field of Classification Search
USPC ........................... 73/861.18, 861.19
See application file for complete search history.

(56) References Cited

U.S. PATENT DOCUMENTS

| | | | |
|---|---|---|---|
| 4,326,274 A | 4/1982 | Hotta et al. | |
| 5,121,628 A | 6/1992 | Merkl et al. | |
| 5,497,666 A * | 3/1996 | Patten et al. | ............. 73/861.355 |
| 2005/0000279 A1 | 1/2005 | Yogeswaren | |
| 2010/0326203 A1* | 12/2010 | Lanham et al. | .......... 73/861.354 |
| 2011/0308317 A1* | 12/2011 | Mueller et al. | .................. 73/632 |

FOREIGN PATENT DOCUMENTS

| | | |
|---|---|---|
| CA | 2 331 536 | 7/2002 |
| DE | 92 17 071 | 2/1993 |
| DE | 42 30 773 | 2/1994 |

(Continued)

OTHER PUBLICATIONS

International Search Report for PCT/EP2009/065290, dated Mar. 28, 2011.

*Primary Examiner* — Jewel V Thompson
(74) *Attorney, Agent, or Firm* — Kenyon & Kenyon LLP (57) ABSTRACT

An ultrasonic transducer is described for use in a fluid medium. The ultrasonic transducer includes at least one piezoelectric transducer element and at least one matching element for promoting an oscillation injection between the piezoelectric transducer element and the fluid medium. The ultrasonic transducer also includes a housing (112), the piezoelectric transducer element being inserted in the housing. The housing has at least one opening facing the fluid medium, the matching element being inserted at least partially into the opening. The ultrasonic transducer also has at least one sealing element, which seals at least one intervening space between the matching element and the housing in such a way that an inner space of the housing is at least largely sealed from the fluid medium.

14 Claims, 1 Drawing Sheet

(56) References Cited

FOREIGN PATENT DOCUMENTS

| | | |
|---|---|---|
| DE | 198 09 207 | 8/1999 |
| DE | 10 2007 010 500 | 9/2008 |
| DE | 10 2008/027974 | 12/2008 |
| EP | 0 005 857 | 12/1979 |
| EP | 0 766 071 | 2/1997 |
| JP | 1-190098 | 7/1989 |
| JP | 1-190099 | 7/1989 |
| JP | 1-158986 | 11/1989 |
| JP | 8-214397 | 8/1996 |
| JP | 9-271097 | 10/1997 |
| JP | 2002-112395 | 4/2002 |
| JP | 2004-48241 | 2/2004 |
| JP | 2004-57806 | 2/2004 |
| JP | 2006-203563 | 8/2006 |
| JP | 2006-303874 | 11/2006 |
| JP | 2008-85413 | 4/2008 |
| JP | 2008-164465 | 7/2008 |
| WO | 2005/031274 | 4/2005 |
| WO | WO 2007/029559 | 3/2007 |

* cited by examiner

US 8,596,139 B2

ULTRASONIC TRANSDUCER FOR USE IN A FLUID MEDIUM

FIELD OF THE INVENTION

The present invention is based on known ultrasonic transducers which are used, for example, in ultrasonic flow meters in process engineering and/or in the automotive sector.

BACKGROUND INFORMATION

Such ultrasonic transducers or ultrasonic flow meters are used in the intake tract and/or the exhaust tract of internal combustion engines, especially for the volume flow or mass flow measurement of air. In those cases, ultrasonic transducers are typically used which are both able to emit ultrasonic waves into a fluid medium, that is, a gas and/or a fluid, and are able to receive ultrasonic waves. Ultrasonic signals are usually transmitted through the flowing fluid medium from an emitter to a receiver, and in the process, the transit time, transit time differences or phases or phase differences of the ultrasonic signals, or even the combinations of these measured variables, are measured. These signals are influenced by the flow of the fluid medium. It is possible to infer the flow speed of the fluid from the degree of the influencing of the transit time. Examples of such ultrasonic transducers, which are also able to be modified, are represented in DE 42 30 773 C1, in EP 0 766 071 A1 or in DE 10 2007 010 500 A1.

In ultrasonic transducers or ultrasonic flow meters, for instance, of the type described above, especially for ultrasonic transit time measurement and/or ultrasonic flow measurement, particularly in gaseous fluid media such as air, so-called matching elements are typically used, for instance, in the form of one or more matching layers. These matching elements take into account the fact that the oscillation energy of injection into the fluid medium that is generated by the usual ultrasonic generators, such as piezoceramics, has to overcome a large acoustical impedance difference, for instance, by a factor of $6\times10^{-5}$. Due to this, as a rule, approximately 99.9995% of the sound energy on the way from a piezoceramic into air is reflected back at the corresponding boundary surface, and is not usable for the measurement. The same reflection loss occurs again at the second receiving transducer element, which may also be identical to the first transducer element. In order to improve the acoustical coupling between the piezo element and the fluid to be measured, as a rule, matching elements, for example, having one or more matching layers are used, particularly in order to increase the signal level swing of ultrasonic flow meters. These matching elements are used for impedance matching and have acoustical impedances which lie between those of the piezoelectric transducer elements and the fluid medium. Such matching layers may include, for instance, $\lambda/4$ layers as diaphragms. For instance, ultrasonic transducers are familiar which have sound-radiating resonance elements or matching elements, such as metallic diaphragms or a $\lambda/4$-impedance-matching layer. Such ultrasonic transducers may be used particularly for flow measurement on air, an air mass signal within a systems control of an internal combustion engine being able to be derived from this flow measurement, for example.

One problem with known ultrasonic transducers or ultrasonic flow meters, however, is that they have to meet the requirements of particular pressure demands. A pressure-resistant ultrasonic transducer design is needed for this purpose. Ultrasonic flow meters are used, for example, for measuring flow in internal combustion engines and particularly in the motor vehicle after a turbocharger and/or a charge air cooler. This position has application advantages and advantages with respect to the system control of the internal combustion engine. However, in such installation positions, the maximum pressures, to which the ultrasonic transducers are exposed, are typically 2 bar to 6 bar. Other applications are also possible.

In ultrasonic transducers or ultrasonic flow meters, which have to meet such high requirements with respect to pressure tightness, the sound-radiating surface is usually designed as an integral component of the transducer housing or the flow tube. With that, however, this sound-radiating surface is usually connected to these components, such as the transducer housing and/or the flow tube, in a hard manner, so that great coupling exists with respect to the spreading of structure-born noise. Such a poor decoupling between the ultrasonic transducer and the surrounding housing or a surrounding flow tube is disadvantageous, however, for the signal quality of the ultrasonic transducers. In order, nevertheless, to provide a certain decoupling, elastomers are frequently used, such as silicone molded parts and/or O-rings. These, in turn, however, reduce the coupling efficiency of the ultrasonic signals into the fluid medium and the coupling-out efficiency of ultrasonic signals from the fluid medium into the transducer. There exists, basically, a conflict of aims between the requirements on the pressure resistance and the required structure-born sound decoupling, since the materials required for damping the relatively hard piezoceramics for sufficient energy coupling have to have a high acoustical impedance, but with that, they don't decouple sufficiently with respect to housing materials that are also hard. On the other hand, additionally applied materials, which would be suitable for decoupling, are too soft to hold the transducer core in a stable position, in response to a pressure exerted frontally from the side.

SUMMARY OF THE INVENTION

Accordingly, an ultrasonic transducer is provided for use in a fluid medium as well as a method for producing an ultrasonic transducer for use in a fluid medium, which at least to a great extent avoid the disadvantages of known ultrasonic transducers. By ultrasonic transducer one should generally understand an element used for producing and/or taking up acoustical energy in the ultrasonic range, and which, for instance, may be used in ultrasonic flow meters of the type described above, particularly in motor vehicle technology. The ultrasonic transducer proposed includes at least one piezoelectric transducer element and at least one matching element to promote oscillation injection between the piezoelectric transducer element and the fluid medium. In this context, the term piezoelectric transducer element is to be broadly understood, and includes, for example, electric-acoustical transducers, which are able to operate according to ferroelectric, electrostatic, magnetostrictive, magnetoelectric effects or combinations of these and/or other effects.

By matching element an element is generally understood which improves the acoustical coupling between the piezoelectric transducer element and the fluid medium, for instance, a gas, especially air, by having an at least partial impedance matching take place. Diaphragms and/or $\lambda/4$ layers may be used, for example, which, individually or in combination may be inserted between the piezoelectric transducer element, for instance, a coupling surface of same, and the fluid medium. In theory, for good ultrasonic coupling, the impedance of the matching element, for instance, of the matching layer, should amount to at least approximately the geometric mean of the impedances of the fluid medium (such as air) and the piezoelectric material of the piezoelectric transducer element. In practice, since this is hardly achievable in most cases, the range for the impedance of the matching element or the matching layer may be provided to be a range between $0.1 \times 10^6$ kg/(m² s) and $2.5 \times 10^6$ kg/(m² s). In a particular manner, the impedance of the matching element is in a range between $0.5 \times 10^6$ kg/(m² s) and $1.6 \times 10^6$ kg/(m² s) or even $1.5 \times 10^6$ kg/(m² s). For example, a value of $0.8 \times 10^6$ kg/(m² s) may be used. These values apply for a single-layer matching layer and air or other gases at normal pressure as the fluid medium. In the case of liquids, higher impedances may be used. Other impedances may, in turn, be used in the case of multi-layer matching layer superstructures. In this case, it may particularly be tried to match the impedances step-wise from the impedance of the piezoelectric material to the impedance of the fluid medium.

The ultrasonic transducer also includes a housing. This housing may include a metal housing, for example, and/or a plastic housing, the material selection of the housing being adaptable to the environmental conditions. As will be mentioned in greater detail below, the exemplary embodiments and/or exemplary methods of the present invention makes possible an extensive decoupling between the housing and the piezoelectric transducer, so that in selecting the material of the housing, only in the region of connection does one have to take into account the oscillation decoupling. The piezoelectric transducer element is inserted into the housing, for instance, into an inner space of the housing. Furthermore, the housing has at least one opening pointing towards the fluid medium, via which the sound coupling into the fluid medium or from the fluid medium into the piezoelectric transducer element is able to take place. This opening, for example, may be a round and/or a polygonal opening, especially a circular opening. The matching element is at least partially inserted into the opening, in this instance. This inserting may take place so that there remains an intervening space between the matching element and the inner wall of the housing in the vicinity of the opening, for example, in the form of an annular gap. Accordingly, the matching element may be designed, for example, as a disk-shaped or a layer-shaped matching element, and may be adapted to the inner geometry of the opening beginning at its outer geometry. In this respect, in turn, the configuration of the matching element may have a polygonal or round outer shape. The at least one piezoelectric transducer may be situated on the side of the matching element facing away from the fluid medium.

As was shown above, in this context, the matching element may be inserted into the opening in such a way that it has no direct contact to the housing, so that direct sound coupling from the housing into the matching element is prevented, at least to a great extent. In order further to reduce the sound coupling, and in order to satisfy the tightness requirements described above, for example, the tightness to pressure of the inner space of the ultrasonic transducer with respect to pressures of up to 2 to 6 bar, in addition at least one sealing element is provided. This sealing element, which should be designed as a separate element, and thus independently of the matching element and the housing, is designed to seal the abovementioned at least one intervening space between the matching element and the housing. This sealing takes place in such a way that an inner space of the housing is at least largely sealed from the fluid medium, for example, up to pressures of 2 to 6 bar.

In this context, the sealing element may be designed in various ways, in order to satisfy the above-mentioned requirements of the sound decoupling between the matching element and the housing, and at the same time to fulfill the tightness to pressure. These options may also be combined. A first possibility is, for example, that the sealing element has a sealing foil at least partially covering the matching element and an end face of the housing surrounding the opening, which may also point towards the fluid medium. This sealing foil thus may completely cover the front side of the ultrasonic transducers, for example, a flat front side pointing towards the fluid medium. By sealing foil one should understand a foil-shaped element, in this context, whose thickness is substantially lower than its lateral dimensions, for instance, by at least a factor of 10, which may be by at least a factor of 100, in particular, by at least a factor of 1000 or 10000.

This sealing foil has sealing properties and ensures, for instance, by itself or in combination with other component parts of the sealing element, the sealing described above, of the inner space of the housing from the fluid medium. This sealing foil may, for example, have a thickness of less than 100 μm, particularly of less than 25 μm. The sealing foil may have at least one metal foil and/or at least one plastic foil, for example. In this instance, duroplastic materials and/or thermoplastic materials may be used, for example. For instance, polyimide foils may be used as duroplastic material. Duroplastic materials are particularly stable thermally and mechanically. Especially, in this instance, they may be Kapton® foils. Alternatively or in addition, PEEK may be used, for example, as the thermoplastic material. Thermoplastic materials, especially PEEK, have greater imperviousness with respect to water vapor. Combinations are also possible, for instance, combinations of a duroplastic and a thermoplastic foil.

Alternatively or in addition to the at least one sealing foil, the sealing element may include at least one decoupling element that is applied at least partially between the housing and the matching element. This decoupling element may completely fill out, for example, the intervening space between the matching element and the housing, for instance, by completely laterally enclosing the matching element, for example, by annularly surrounding it. As was described above, this intervening space may be an annular intervening space and/or an intervening space having a polygonal, such as a rectangular shape. The decoupling element is arranged so as to ensure an at least partial decoupling of structure-borne noise between the housing and the matching element. Accordingly, the material of the decoupling element may be selected to be softer than the material of the housing and/or the matching element.

In this way, it is possible to have a separate optimization of the material properties of the housing and the matching element, the structure-borne noise decoupling being able to be ensured by the decoupling element being designed as a completely independent element. In order to ensure the decoupling, the decoupling element may have an elastomer material, for example, particularly a silicone material and/or a polyurethane. For example, one may use liquid silicone rubber, LSR. Generally speaking, the decoupling element may have at least one plastic material, especially an elastomer material, which has a Shore A hardness of less than 40, which may be less than 25. In particular, one may also use composite materials, for instance, composite materials made of at least one matrix material, especially an elastomer matrix material, and at least one filler material. Suitable filler materials may have gas occlusions, such as gas bubbles, by using elastomer foams, for example. Alternatively or in addition, solid occlusions may also be suitable for filler material, such as hollow plastic spheres, or as a component of the filler material, for example, hollow gas-filled spheres. Such a decoupling element is able to ensure superbly the abovementioned properties of the decoupling of structure-borne noise between the housing and the matching element. In order to ensure complete sealing at the same time, such a decoupling element may be combined, for instance, with the above-mentioned sealing foil. Thus, the disk-shaped matching element may be annularly fully enclosed by the decoupling element, to which the housing is adjacent on the outside. The entire end face of this system, which faces the fluid medium, may then be covered by the sealing foil, for example.

The decoupling element is able to enclose the matching element completely or partially, as shown above. The decoupling element may include at least one lining of an inner surface of the housing, such as a covering in the vicinity of the at least one opening. Alternatively or in addition, a remaining hollow space within the housing may be filled up with a damping element, such as a damping casting compound. The hollow space above the piezoelectric transducer element, for example, may be filled up completely or partially with a sealing compound as damping casting compound. In this instance, again silicones and/or epoxides and/or polyurethane may be used, for example, which may be worked by pouring, for example, and which have damping properties. In particular, one may also again use composite materials in this instance, for example, composite materials made of at least one matrix material, especially an elastomer matrix material, and/or a duroplastic matrix material, and at least one filler material. However, thermoplastic matrix materials are basically also possible. Suitable filler materials may again have gas occlusions, such as gas bubbles, by using elastomer foams, for example. Alternatively or in addition, solid occlusions may also be suitable for filler material, such as hollow plastic spheres, or as a component of the filler material, for example, gas-filled hollow spheres. Alternatively or in addition, heavier filler materials also come into consideration, such as silicates, ceramic particles or metal particles such as tungsten particles. In this context, the matrix material should be as soft as possible, and have a high loss module. For example, matrix materials should be used which have a Shore A hardness between 5 and 50. By contrast, the filler material should be made as dense as possible, such as having a density of more than 2 $g/cm^3$, which may be of more than 4 $g/cm^3$. Alternatively or in addition to an embodiment of the damping element in the form of a damping casting compound, the damping element may also be designed in a different manner, for example, by using molded parts, as described in greater detail below.

The housing may include a housing sleeve, for example, for instance, a cylindrical housing sleeve. In particular, this housing sleeve may be designed as a metal sleeve, for instance, a combined cutting and bending part. One may also, however, basically use plastic materials or other materials or composite materials. The housing sleeve may have the opening mentioned, facing the fluid medium, and furthermore at least one second opening, if necessary. In particular, this may be a rear side opening, that is, an opening that is opposite to the opening that faces the fluid medium, and may be situated on the side of the ultrasonic transducer facing away from the fluid medium. This second opening may be closed by at least one closing element. In this context, optionally at least one electrical connecting contact of the piezoelectric transducer element may be guided through the second opening to the outside of the housing. In this way the contacting of the piezoelectric transducer element is possible in order, for example, to activate the piezoelectric transducer element to emit acoustical signals, and/or, when picking up acoustical signals by the piezoelectric transducer element, to scan the electrical signals generated.

The closing element in this instance may be designed in different ways, which may make possible leading through of the at least one electrical connecting contact. For instance, at least one wall segment of the housing may be provided that is able to be bent over, which in the bent-over state closes the second opening at least partially. A crimped closure may be ensured in this way, for example, using one or more wall segments that are able to be bent over. The wall element that is able to be bent over may be connected, for instance, as one piece with the housing sleeve, or be a part of this housing sleeve. Alternatively or in addition to the use of wall segments, that are able to be bent over for closing the second opening, other types of closing elements may also be used, for example, at least one closing cap. A closing cap and/or a closing ring may be used, for example, which is able to be mounted on the housing sleeve and be connected to the housing sleeve via appropriate snap-in elements, such as latches. Other designs are conceivable as well.

In this context, the closing effect does not necessarily have to take place completely, but may also take place partially, for example. Thus, for instance, by the partial closing, on the one hand, a supporting effect of the entire transducer core may take place, that is, an element which includes the piezoelectric transducer element and perhaps the matching element, the damping element and the decoupling element. In addition, however, because of the incomplete closing, for instance, a thermal expansion of the transducer core may be admitted, without thereby thermomechanically stressing the front sealing element and/or its fastening too greatly. For example, an inwards facing crimping and/or an inwards facing bead of the housing sleeve may as closing element, already ensure the required closing and supporting effect, but it may at the same time permit the required thermal expansion of the transducer core. Also, the closing effect does not necessarily have to take place completely at the rear end of the housing, but may also be connected at least slightly in front of this end.

Furthermore, the housing of the ultrasonic transducers may have at least one interface element on the outside, which is used for the mechanical connection to a measuring chamber for accommodating the fluid medium. This measuring chamber may particularly be a flow tube for conducting the fluid medium. In this way, the ultrasonic transducer may, for instance, be integrated directly into the flow tube and/or a segment of the flow tube, so that an ultrasonic transducer-sensor device is created, for example, as an ultrasonic flow meter or as a component part of such an ultrasonic flow meter. The interface element may particularly have an encircling edge, which may be a crimped edge, via which the connection to the measuring chamber wall may be produced. Other embodiments are also conceivable, such as in the form of flanges, beads, fastening elements of other types, or the like.

Besides the ultrasonic transducer according to one or more of the specific embodiments described above, a method is further provided for producing an ultrasonic transducer for use in a fluid medium. The method may be used particularly for producing an ultrasonic transducer according to one or more of the specific embodiments described above, so that, with respect to possible specific embodiments of the method, one may refer to the above description. In the method provided, at least one piezoelectric transducer element is installed in a housing which has at least one opening facing the fluid medium. At least one matching element to promote an oscillation injection between the piezoelectric transducer element and the fluid medium is at least partially inserted into the opening. Furthermore, at least one sealing element is connected to the matching element and the housing in such a way that the sealing element seals at least one intervening space between the matching element and the housing, an inner space of the housing being sealed at least to a great extent from the fluid medium. It should be pointed out that the method steps are able to be executed in the sequence shown, which is not absolutely necessary, however. A different sequence than the sequence shown is also possible. Moreover, carrying out additional method steps that were not named is also possible. An execution of individual method steps parallel in time or overlapping in time is conceivable, as well as a repeated execution of individual or several method steps.

The method may particularly be executed in such a way that the matching element is connected to the housing in one connecting step via the sealing element. In particular, this connecting step may be a single connecting step, for instance, a connecting step in which simultaneously a continuous material connection takes place between the matching element and the sealing element and the housing. In particular, in this context, as shown above, at least one sealing foil and/or at least one decoupling element may again be used as sealing element. In this instance, an assembly may be formed which includes at least three interconnected individual parts. In the method provided, furthermore at least one sealing foil may be connected to an end face of the housing surrounding the opening and a surface of the matching element, which may also be designated as a coupling surface of the matching element to the fluid medium. In particular, this connection may include a continuous material connection and/or a press-fit connection, especially a pressing at increased temperature. Various embodiments are possible.

The ultrasonic transducer and the method in one or more of the specific embodiments described above, have multiple advantages compared to known ultrasonic transducers and known methods. Thus, a pressure-resistant ultrasonic transducer may be provided which, via the sealing element described, especially the sealing foil and/or the decoupling element, at overpressure of the fluid medium that is to be measured, for instance, air, takes up the corresponding force at the front side and passes it on to the housing at the circumference and on the back side in continuous material. Because of a completely encircling, as much as possible incompressible decoupling, for instance by the decoupling element described, there comes about a stable construction of the ultrasonic transducer, which the piezoelectric transducer element is able to hold in a stable position, even when there is a frontally exerted pressure coming from the side. For production reasons, one may also use only a partially encircling or extensively encircling decoupling, for example, by the decoupling element described. In general, the decoupling element may be designed always to ensure a distance between the housing and the matching element, which is used for damping.

Moreover, in the case of the configuration according to the exemplary embodiments and/or exemplary methods of the present invention, one may do without an acoustically less favorable radiation surface, that is made up of harder materials or is connected to the housing in a stable manner. Such a radiation surface, which is connected as one piece with the housing, is described, for instance, in DE 42 30 773 C1 or in EP 0 766 071 A1, which, however has the disadvantages named with respect to the material selection. These disadvantages may be circumvented by separate optimization of the individual materials. Because of one form-locking force conduction, for instance, on the back side that is optional according to the present invention, particularly via the housing, the ultrasonic transducer is still able to be designed resistant to pressure. Because of the exemplary embodiments and/or exemplary methods of the present invention, furthermore, an effective decoupling from structure-borne noise is possible, for which normally a relatively soft material is required. This decoupling, as shown above, is now able to be taken over by the decoupling element, whose material properties are able to be optimized separately. In spite of this suspension, the matching element and the piezoelectric transducer element may be designed to be relatively stable as to position, even at high counterpressures.

The proposed method makes possible the connection of the matching element to the housing via, for instance, the decoupling element and/or the sealing foil in what may be one single connecting process to form an assembly which has three or more individual parts. Subsequently, additional elements may be inserted. For instance, the piezoelectric transducer element may be inserted into the assembly only after the production of the assembly mentioned. In this way, because of forward displacement of the production of the assembly, mechanical and/or thermal stresses, which could cause harm to additional components of the ultrasonic transducer, are kept away from these additional components.

Exemplary embodiments of the present invention are shown in the drawings and explained in greater detail in the following description.

DETAILED DESCRIPTION

Figure 1:
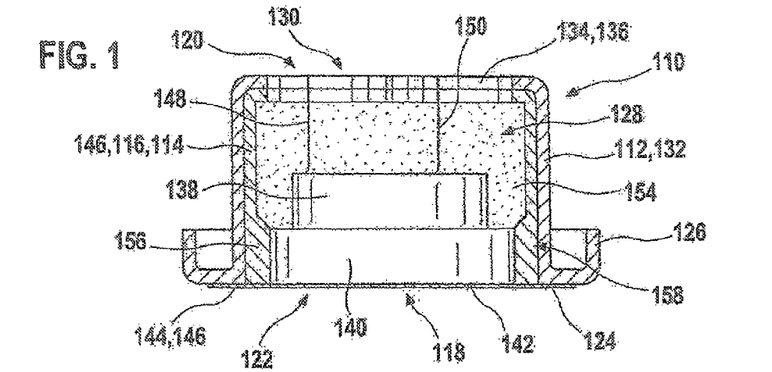
FIG. 1 shows a specific embodiment of an ultrasonic transducer according to the present invention, in a sectional representation.
Figure 2:
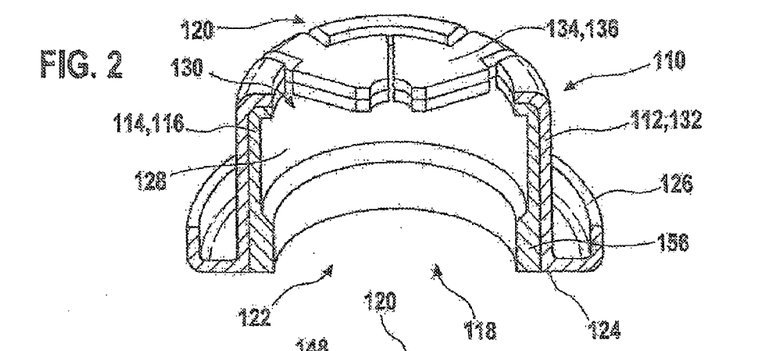
FIG. 2 shows a housing of the ultrasonic transducer according to FIG. 1 cut open, having a decoupling element.
Figure 3:
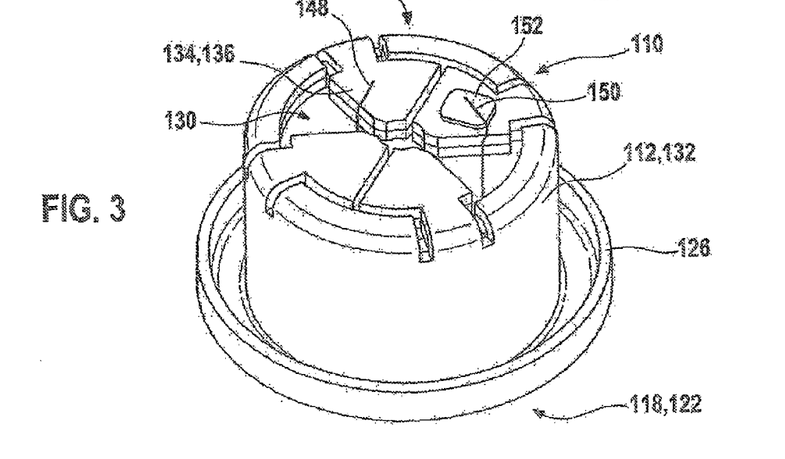
FIG. 3 shows the ultrasonic transducer according to FIG. 1 in a perspective view, at an angle from above.

In FIGS. 1 to 3, an exemplary embodiment is shown of an ultrasonic transducer 110 in various representations. FIG. 1 shows a sectional representation as seen from the side, and FIG. 3 shows a perspective view of ultrasonic transducer 110 in a view at an angle from above. FIG. 2 shows a housing 112 of the ultrasonic transducer having a decoupling element 114 in the form of a lining 116. Additional elements of ultrasonic transducer 110 according to FIG. 1 are not shown in FIG. 2 for the sake of simplicity. The ultrasonic transducer 110 has a front side 118 which points towards the fluid medium during the operation of the ultrasonic transducer 110. Furthermore, the ultrasonic transducer 110 has a back side 120, which will, as a rule, not be in contact with the fluid medium, such as air, during operation. Housing 112 is essentially designed to be cup-shaped, and has an opening 122 on front side 118, which is particularly recognizable in FIG. 2. This opening 122 is surrounded by an end face 124 of the housing in an annular manner in this exemplary embodiment. Furthermore, housing 112 has a hard interface in the form of a crimped edge 126 which, for example, may be adhered to additional parts of a sensor system of an ultrasonic transducer, or may be connected in another way, such as to a measuring chamber, particularly a flow pipe, for conducting the fluid medium.

Housing 112 has an inner space 128. This inner space 128 is bordered towards front side 118 by opening 122, and towards back side 120 by a second opening 130. Thus, in the exemplary embodiment shown, second opening 130 is designed as a back side opening of a housing sleeve 132 of housing 112, and is closed off by closing elements 134. In the exemplary embodiment shown, these closing elements 134 are formed by bent-over wall segments 136 of housing 112.

Accordingly, housing 112 may be developed as a part made by combined cutting and bending, for instance, in the form of a metal housing. In the exemplary embodiment shown, four wall segments 136 are provided, another design also being possible, however. Closing elements 134 close second opening 130, as may be seen particularly in FIG. 3, although in the exemplary embodiment it is not shown completely.

In inner space 128 of ultrasonic transducer 110, a piezoelectric transducer element 138 and a matching element 140 are accommodated, which are both executed as annular disks in the exemplary embodiment shown. However, other designs are also possible. In its diameter, matching element 140 is dimensioned larger than piezoelectric transducer element 138, and borders directly on lining 116 of decoupling element 114. Matching element 140, or a coupling surface 142 of this matching element 140, and end face 124 of housing 112 are connected to each other via a sealing foil 144. In the exemplary embodiment shown, this sealing foil 144, which is recognizable in FIG. 1, forms a sealing element 146 together with decoupling element 114.

In the exemplary embodiment shown, piezoelectric transducer element 138 is able to be electrically contactable using two connecting contacts 148, 150. These connecting contacts 148, 150, which may be designed as connecting wires, for instance, are guided all the way through inner space 128 and through second opening 130 to the outer side of housing 112 on back side 120. At that place, these two may be fixed, for instance, on insulated contact surfaces, as may be seen especially in FIG. 3. In FIG. 3, only one connecting contact 150 is situated on an insulated contact pad 152, whereas second connecting contact 150 lies directly on housing 112. Instead of this connection of one of connecting contacts 148, 150 to housing 112, insulation may also take place, however, with respect to this connecting contact 148.

Moreover, a damping element is inserted into inner space 128, which remains after the insertion of matching element 140 of piezoelectric transducer element 138 and of the decoupling element, which damping element is designed in this exemplary embodiment as a damping casting compound 154. This damping casting compound 154, which is used for damping, may be inserted in most different ways, the term "casting compound" not necessarily being limited to a pure casting as the insertion technique. A different kind of insertion of a deformable mass as damping casting compound 154 is basically also possible. What may be particularly preferred, however, since this is conditional upon a particularly favorable filling up of what may be all remaining hollow spaces in inner space 128, is casting, for instance, using an epoxide, a silicone, a polyurethane or similar plastics, especially elastomers. The damping element, especially damping casting compound 154, may also be combined fully or partially with the abovementioned decoupling element 114. In this case, the damping element could extend, for instance, right up to sealing foil 144.

For the production of ultrasonic transducer 110 shown in the figures, a cylindrical piezo element could be used as the piezoelectric transducer element 138, for example. Material PZT5A may be used, for example, that is, a ceramic having relatively low mechanical quality, high bandwidth and low impedance, as well as high deflection. For instance, piezo elements having a diameter of 8 mm and a height of 2 mm may be used. Such a diameter yields, for instance, a planar resonance in the range between 200 kHz and 240 kHz, which is able to represent a good compromise for the application, with respect to different requirements. From that high a quantity, one may derive a certain stiffness with respect to a deflection, whereby an unfavorable and temperature-dependent mode coupling can be avoided.

Matching element 140 may be made, for instance, of a pressed and porously sintered polyimide. The polyimide of the Vesper® brand of the firm of DuPont may be used, for example, which has a density of 0.7 g/cm$^3$. Matching element 140 may have a thickness of ca. 1 mm, for example. Other dimensionings are also basically possible, however, as well as the choice of other types of material for matching element 140, for instance, one or more of the materials named in EP 0 766 071 A1, in DE 10 2007 010 500 A1 or DE 42 30 773 C1.

The construction of ultrasonic transducer 110 may begin, for example, using an adhesive-coated sealing foil 144. As sealing foil 144, one may also use a polyimide, for example, for instance, Kapton®. The sealing foil may have a thickness of less than 25 μm, for instance. An unpatterned sealing foil 144 may first be used, for instance, onto which, expediently, matching elements 140, such as matching layers, as well as housing sleeves 132, such as metal sleeves, may then be applied. The metal sleeves may be produced as parts made by combined cutting and bending, and may be provided with a lining 116 as decoupling element 114. A lining using liquid silicone (rubber) (LSR) may be applied, for example. This LSR layer may have a Shore A hardness of 25, for example, and may be used for structure-borne noise decoupling.

For connecting the elements named of sealing foil 144, housing sleeve 132 and matching element 140, one may use a press-fit technique, for example, and/or a thermal technique and/or other techniques. This connection may be additionally supported by an autoclave process. Thus, for example, in an autoclave process, housing sleeve 132 and matching element 140 may expediently be pressed onto sealing foil 144, under the influence of temperature. This autoclave process may, for instance, be carried out in a similar manner to the production of fiber-plastic composite materials. A slightly elastic counter-shape may, for instance, be laid over matching elements 140 and housing sleeves 132 placed on sealing foil 144. For instance, by air pressure, which is able to be generated in compressors, this counter-shape may then be pressed against the components mentioned, and press them under temperature influence onto sealing foil 144. The elasticity of the counter-shape may compensate for certain tolerance deviations of the components. By optional additional, one-sided evacuation, excess air is able to be removed from the composite construction. The counter-shape may be used at the same time for guiding and positioning the components among one another. The counter-shape may also lie against the bottom, and then be equipped from above with matching layers of matching element 140 and housing sleeves 132 and, at the end, be covered with sealing foil 144 and a press-on mat, for example. An improved position tolerance between matching element 140 and housing sleeves 132 may also be achieved by a form-locking positioning of matching elements 140 and LSR layers of lining 116, for instance, by an inner thickening 156 of lining 116 in the vicinity of opening 122, that is recognizable in FIGS. 1 and 2. The inner diameter of this thickening 156 of LSR lining 116 may correspond exactly to the outer diameter of matching element 140, for example. Thickening 156 may fill out completely an intervening space 158 between matching element 140 and housing 112 in the area of opening 122. In the example shown (see particularly FIG. 1), intervening space 158 may be configured to be annular. After the separation of the individual assemblies, which each include one housing sleeve 132, one matching element 140 and sealing foil 144, piezoelectric transducer elements 138 may then be applied onto matching element 140, for instance, by adhesion. Piezoelectric transducer elements 138 may either be equipped using the usual electrode arrangement at two end faces, so that, before the connection with the matching element mentioned, at least the contacting facing matching element 140, for instance, one of connecting contacts 148, 150, should already have been applied.

In this case, there should be a recess in matching element 140, that is able to accommodate this contacting. Alternatively or in addition, a piezoelectric transducer element 138 may also be used, which has an electrode that is drawn around, which is able to be contacted from the back side after the connection to matching element 140. In both cases, connecting contacts 148, 150, such as the contact wires, may be held, after being guided to the contacting, while wall segments 136 of housing sleeve 132 are bent over. Subsequently, on the back wall of housing sleeve 132 thus created, connecting contacts 148, 150 may be deposited and contacted thereupon. Housing sleeve 132 itself may be designed, for instance, as a metallic sleeve, and may be connected as an EMC screening (electromagnetic compatibility screening] to one of connecting contacts 148, 150 (connecting contact 148, in FIG. 3). Lastly, inner space 128 may have a damping element in the form of a damping casting compound 154 poured in it. This damping casting compound 154 may particularly be designed to be clearly harder than decoupling element 114, especially than lining 116. In this way, damping casting compound 154 may take up a sufficient quantity of sound energy from piezoelectric transducer element 138. The curing of an optional adhesion between piezoelectric transducer element 138 and matching element 140 may optionally take place simultaneously with the curing of damping casting compound 154.

Various modifications of the construction described above are possible. Thus, the contacting of piezoelectric transducer element 138 may also, for example, be formed by one single wire and/or via a metallic structural part, another electrode of piezoelectric transducer element 138 being able to be conductively connected to it already inside housing sleeve 132, for instance, the metal sleeve. Alternatively or in addition to casting, damping casting compound 154, as was described above, may also be inserted as a molded part, which, within the scope of the present invention, should still be understood under the term "damping casting compound". Such a molded part may be pressed against piezoelectric transducer element 138, for instance, by the closing of closing elements 134 or wall segments 136, so that it is damped and/or at least one of the two contactings is able to be fixed and/or pressed on during the production process. The contacting of piezoelectric transducer element 138, for instance, the connection to connecting contacts 148, 150, may furthermore, alternatively or in addition, also take place via a conductive adhesive, soldering, wire bonding, thermal compression welding, or a combination of the techniques mentioned and/or other techniques.

Moreover, a design is also conceivable in which a cylindrical housing sleeve 132 is lined using a decoupling and damping material as a part of decoupling element 114 essentially at the circumference, into which matching element 140, for instance, a matching layer, and/or piezoelectric transducer element 138 may be countersunk and/or which is then able to be slipped over matching element 140 and/or piezoelectric transducer element 138, in addition, sealing being able to take place using a coating and/or a foil.

For good resistance to pressure, it is of advantage if housing sleeve 132 has recesses on back side 120 that are as small as possible, if any. It would be optimal to have a complete closing by closing elements 134, since then decoupling element 114, for instance, lining 116, may then be designed, in principle, to be very soft. If the decoupling mass of decoupling element 114 is incompressible, the pressure of the fluid medium, that is acting uniformly over the radiation surface on front side 118 of ultrasonic transducer 110, does not lead to a change in position of the transducer core, especially of piezoelectric transducer element 138. It is also of advantage that the decoupling runs around along back side 120 of housing 112, via decoupling element 114, particularly via lining 116. This is recognizable in FIGS. 1 and 2, since there lining 116 also extends over wall segments 136. This is conditioned by the fact that, for an optimal pressure resistance, damping casting compound 154 does not have to border directly on the back wall of housing 112, in which case structure-borne noise, based on the greater hardness of damping casting compound 154, would be transmitted by the latter to housing 112, which, in turn, could lead to interference signals in a second ultrasonic transducer 110 that is mounted nearby.

Alternatively to bending over of wall segments 136 of housing sleeve 132, shown in FIGS. 1 to 3, the back wall of housing 112 may also be formed by a separate component, such as in the form of a cap. This separate component may be fixed via fixing elements, such as latches. In this case, the cap may, for instance, also be lined ahead of time with decoupling material or a lining 116, or decoupling material may be applied on the back side onto the damping element or damping casting compound 154, before the cap is set onto it. In this or in other embodiments of the present invention, in principle, the insertion of damping casting compound 154 and the closing of the back wall of housing 112, whether by bending over, by a separate component, or by similar closing measures, may also be reversed.

As shown above, housing sleeve 132 may particularly be made of a metallic material. Alternatively or in addition, housing 112 may, however, also be produced wholly or partially of a plastic. What is particularly advantageous is the interface shown in the specific embodiment according to FIGS. 1 to 3, in the form of crimped edge 126. Other embodiments of hard interfaces are also conceivable. By contrast to many ultrasonic transducers that are customary in the trade, the decoupling as interface thus lies outside on housing 112, by which it is prevented that the former is sealed by construction measures on ultrasonic transducer 110 itself.

Matching element 140 may be designed in various ways. This matching element 140 may, for instance, be embodied as a matching layer and/or may include a matching layer. The matching element may include, for instance, a thermal, chemical or photochemically curable or cross-linkable polymer material. This polymer material may, for example, include a syntactic material, a duroplastic material, especially an epoxy resin, a polyester, a phenolic resin or a cyanate ester, a thermoplastic material, and elastomer, especially a silicone, a polymer blend, a polyimide, especially Kapton®, or a mixture of the materials named and/or other materials. Besides this, the polymer material may also include at least one filler material, especially for the purpose of the reduction of the density, in particular, at least one of the following filler materials: hollow spaces (for example, hollow spaces produced by foaming), fibers, glass hollow spheres, hollow plastic spheres, a volatile filler (in particular, a filler that may escape or be removed during or after the cross-linking of the polymer) or combinations of the filler materials named and/or other ones. Alternatively or in addition, matching element 140 may also include an epoxy resin-hollow glass sphere mixture. Again, alternatively or in addition, as shown above, matching element 140 may also include porously sintered polyimide, particularly the Vespel® named before. The matching element, particularly the Vespel® matching layer, before further processing, may also be provided with a coating, for instance, a parylene coating. Such a coating may be embodied, for example, so as to close pores on the surface of matching element 140 in such a way that the seeping away of adhesive in subsequent process steps may be suppressed.

Besides matching element 140 and sealing foil 144, ultrasonic transducer 110 may possibly include further layers, for instance, additional matching layers and/or equalization layers and/or stabilization elements which, for example, may have a thermal and/or mechanical and/or acoustical matching effect. These additional layers may be accommodated, for example, between piezoelectric transducer element 138 and matching element 140, coated, if necessary, and/or between matching element 140 and sealing foil 144.

If ultrasonic transducer 110 includes metallic materials, for instance, in the form of a metallic housing 112, these may be electrically insulated by sealing foil 144, even from the fluid medium, on front side 118. For this purpose, it may be advantageous if sealing foil 144 is wholly or partially made of an electrically insulating material. Electrically conductive components of housing 112 and/or an electrically conductive foil or layer may also be used at the same time, however, as an EMC measure, especially for screening.

What is claimed is:

1. An ultrasonic transducer for use in a fluid medium, comprising:
    at least one piezoelectric transducer element;
    at least one matching element to promote an oscillation injection between the piezoelectric transducer element and the fluid medium;
    a housing, wherein the piezoelectric transducer element is inserted into the housing, the housing having at least one opening facing the fluid medium, wherein the at least one matching element is inserted at least partially into the opening; and
    at least one sealing element sealing at least one intervening space between the matching element and the housing so that an inner space of the housing is at least largely sealed from the fluid medium.

2. The ultrasonic transducer of claim 1, wherein the sealing element includes a sealing foil that at least partially covers the matching element and an end face of the housing surrounding the opening.

3. The ultrasonic transducer of claim 2, wherein the sealing foil has at least one of at least one metal foil and at least one plastic foil.

4. The ultrasonic transducer of claim 1, wherein the sealing element includes at least one decoupling element that is inserted at least partially between the housing and the matching element, and wherein the decoupling element is equipped to ensure an at least partial decoupling of structure-borne noise between the housing and the matching element.

5. The ultrasonic transducer of claim 4, wherein the decoupling element has an elastomer material, which includes at least one of a polyurethane material and a silicone material, which is a liquid silicone.

6. The ultrasonic transducer of claim 4, wherein the decoupling element has at least one plastic material having a Shore A hardness of less than 40.

7. The ultrasonic transducer of claim 4, wherein the decoupling element includes at least one lining of an inner surface of the housing.

8. The ultrasonic transducer of claim 1, wherein a remaining hollow space within the housing is filled up using a damping element, which includes a damping casting compound.

9. The ultrasonic transducer of claim 1, wherein the housing has a housing sleeve, which is a metal sleeve, having the opening facing the fluid medium and at least one second opening, which is a back side opening, wherein the second opening is closed by at least one closing element, and wherein at least one electrical connecting contact of the piezoelectric transducer element is guided through the second opening to an outer side of the housing.

10. The ultrasonic transducer of claim 9, wherein the closing element has at least one of (i) at least one wall segment of the housing that is able to be bent over the housing sleeve, and (ii) at least one closing cap.

11. The ultrasonic transducer of claim 1, wherein the housing has on one outer side at least one interface element, which is an encircling edge, for connecting to a measuring chamber.

12. The ultrasonic transducer of claim 1, wherein the sealing element includes a sealing foil that at least partially covers the matching element and an end face of the housing surrounding the opening, wherein the sealing foil has a thickness of less than 25 μm.

13. The ultrasonic transducer of claim 4, wherein the decoupling element has at least one plastic material, which is an elastomer material, having a Shore A hardness of less than 25.

14. The ultrasonic transducer of claim 1, wherein the housing has on one outer side at least one interface element, which is an encircling edge that is a crimped edge, for connecting to a measuring chamber, which is a flow pipe for conducting the fluid medium.

\* \* \* \* \*

UNITED STATES PATENT AND TRADEMARK OFFICE
CERTIFICATE OF CORRECTION

PATENT NO.       : 8,596,139 B2                                Page 1 of 1
APPLICATION NO. : 13/141963
DATED            : December 3, 2013
INVENTOR(S)      : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 279 days.

Signed and Sealed this
Twenty-second Day of September, 2015

Michelle K. Lee
*Director of the United States Patent and Trademark Office*